W. F. Milliman,

Saw.

No. 108,040.  Patented Oct. 4, 1870.

WITNESSES

United States Patent Office.

WILLIAM F. MILLIMAN, OF PHILADELPHIA, PENNSYLVANIA, ASSIGNOR TO HENRY DISSTON & SON, OF SAME PLACE.

Letters Patent No. 108,040, dated October 4, 1870.

IMPROVEMENT IN SAWS.

The Schedule referred to in these Letters Patent and making part of the same.

I, WILLIAM F. MILLIMAN, of Philadelphia, county of Philadelphia, State of Pennsylvania, have invented an Improvement in Saws, of which the following is a specification.

Nature and Object of the Invention.

My invention consists of a cross-cut saw, having sections of teeth, separated from each other by recesses, each section being composed of three teeth, arranged and having the relative bevels, described hereafter, so that the intermediate teeth of the sections can be made to control the extent of penetration of the outer teeth without impairing the cutting effect of the latter, thereby rendering the saw easily adaptable for operating on hard or soft woods, while the efficiency of the saw is increased, as regards its rapid cutting properties and small amount of exertion required to operate it.

Description of the Accompanying Drawing.

Figure 1:
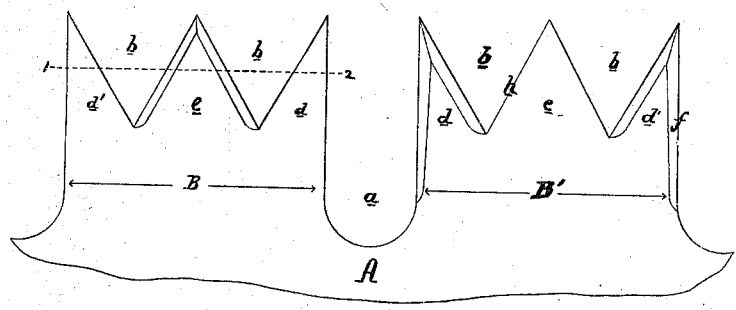

Figure 1 represents part of a saw-blade, with my improved teeth, and

Figure 2:
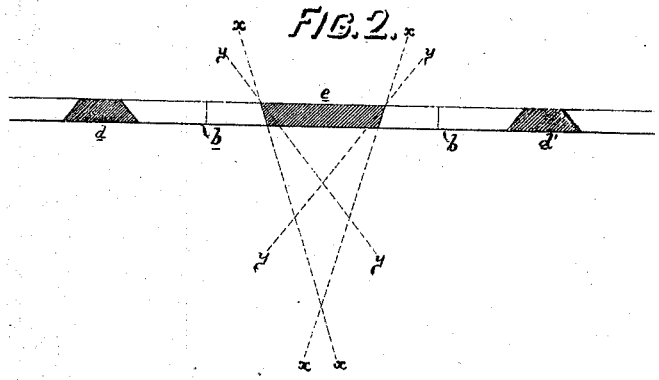

Figure 2, a section of one of the teeth, on the line 1-2, fig. 1.

Fig. 1 is drawn to a scale of about double, and fig. 2 to a scale of about quadruple the actual size.

General Description.

The edge of the blade is separated by recesses $a$, arranged, at equal distances apart, into sections B and B', which may be termed the teeth proper, and each section is separated, by angular and shallower recesses $b$, into three minor teeth, $d$, $d'$, and $e$, each of the former having that side adjacent to a recess, $a$, straight, and the opposite side inclined, and the center tooth having both sides inclined.

All the teeth of each section are beveled to sharp cutting-edges and points, those of the teeth $d$ and $d'$ on one side of the blade, and the central tooth $e$ on the opposite side of the blade, and the teeth of one section are beveled on the side opposite to that on which the corresponding teeth of the adjacent section are beveled, and this arrangement is continued throughout.

All the teeth of the saw are cutting-teeth, the so-called clearing-teeth common to cross-cut saws of this class being discarded. But while the intermediate tooth $e$ is essentially a cutting, or rather a scoring-tooth, it, at the same time, serves as a regulating-tooth, for on the character of its beveled edges depends the extent of the penetration of the outer teeth $d$ and $d'$. If the inclined sides of the tooth $e$, for instance, be beveled abruptly, as in the direction of the dotted lines $x\ x$, fig. 2, so that its penetrating property is limited, it will prevent excessive penetration of the outer teeth. If the edges of the central tooth, however, are more inclined, as on the line $y\ y$, fig. 2, for instance, its penetrating property will be increased, and it will permit the outer teeth to cut more deeply.

It will be seen, therefore, that the center teeth of the sections are the controlling teeth as regards the depth of the cut, and that these central teeth can be so beveled as to adapt the saw for operating on hard or soft wood without altering the outer teeth, which retain their shape and effective cutting-edges.

But the most important feature of my invention may be explained as follows:

In cross-cut saws excessive penetration of the teeth is prevented by beveling them abruptly, or, in other words, making the teeth blunt. But, while this has the desired effect of preventing the excessive penetration, it destroys the clean and easy cutting effect of the teeth.

Now, in my improvement the outer teeth $d$ and $d'$ of each section, which have the most cutting to do, are so beveled as to have sharp cutting-edges—so sharp that, if these teeth were uncontrolled by the intermediate tooth $e$, they would penetrate too deeply. The central cutting-teeth, however, or, as they may be more properly called, scoring-teeth, are beveled abruptly to a degree determined by the character of the wood to be operated on, and these teeth, by the abruptness of their beveled edges, prevent the excessive penetration of the outer teeth. In other words, two-thirds of the teeth are acting with the effect of sharp chisels, and at the expense of comparatively little exertion, upon so much of the wood as they are permitted to act upon by the intermediate controlling-teeth.

Long-continued and careful tests have proved the superiority of this arrangement of teeth, both as regards their rapid cutting effect, and comparatively little exertion required in operating the saw.

I wish it to be understood that I do not desire to claim, broadly, a saw-blade separated at the edge, by recesses, into sections, and the separating of the sections into minor teeth, irrespective of the number of teeth in each section, and the arrangement of the beveled edges.

Claim.

The saw A, having groups of teeth B and B', separated by recesses $a$, each group being composed of teeth $d$, $d'$, and $e$, all constructed and arranged as shown and described.

In testimony whereof, I have signed my name to this specification in the presence of two subscribing witnesses.

WILLIAM F. MILLIMAN.

Witnesses:
A. H. SHOEMAKER,
H. HOWSON.